Patented June 9, 1925.

1,541,545

UNITED STATES PATENT OFFICE.

ALFRED A. WELLS, OF MONTCLAIR, NEW JERSEY, ASSIGNOR, BY MESNE ASSIGNMENTS, TO SETH B. HUNT, TRUSTEE, OF MOUNT KISCO, NEW YORK.

CATALYTIC OXIDATION OF SECONDARY ALCOHOLS.

No Drawing. Application filed May 18, 1918. Serial No. 235,249.

*To all whom it may concern:*

Be it known that I, ALFRED A. WELLS, a citizen of the United States, and a resident of Montclair, in the county of Essex and State of New Jersey, have invented certain new and useful Improvements in Catalytic Oxidation of Secondary Alcohols, of which the following is a specification.

This invention relates to a method of oxidizing alcohols and particularly secondary alcohols of the aliphatic series such as secondary propyl or butyl alcohols or higher alcohols by contact of such alcohols with catalytic material as will be hereinafter described.

The invention is especially concerned with the production of ketones and fatty acids by exposure of alcohols obtained from petroleum by hydrolysis of sulphuric acid extract, prepared in accordance with the process described in the patent to Mann & Williams, No. 1,365,043, granted Jan. 11th, 1921. For example olefin material from cracked gasoline may be dissolved in sulphuric acid of 1.8 specific gravity at a temperature below 20° C. and treated with water to form alcohols which may be used in the present operation. Alcohols substantially corresponding to the unsaturated material of the gasoline are thus obtained.

The catalytic material is preferably a metallic oxide, such as an oxide of copper, and the like. Or in some cases compounds of these oxides may be employed including bodies of the type of copper chromate, etc.

Manganese dioxide may be employed as this readily gives up its oxygen and in the presence of oxygen will be re-oxidized so that the alcohols may be passed in vapor form over the heated dioxide to form acids, aldehydes and ketones and subsequently the manganese dioxide exposed to heated air or oxygen to re-form the dioxide. Barium peroxide may be used in like manner or mixtures of the two peroxides, etc. Similarly metallic catalyzers such as silver or copper and especially catalyzers of the platinum group of metals including platinum, palladium, osmium and the like may be employed.

The alcohols may be vaporized with steam and admixed with air and passed over the catalytic material or the steam may be omitted, the dry alcohols with the air being brought into contact with the platinum, manganese dioxide, silver compounds or other form of catalyzer or contact material or oxidizing agent, and oxidized to the ketone stage or if desired to a fatty acid. By milder oxidation aldehydes may be formed.

The temperature of oxidation will vary from say 100° up to a low red heat. As the reaction usually takes place with the evolution of heat, which may be moderate or violent, according to circumstances, cooling of catalytic mass may be resorted to when necessary. In one case when the vapors of the alcohols were passed over manganese dioxide at about 200° C., oxygen also being present, the temperature began to rise rapidly and reached 260° C. without any additional external heating. In another case granular manganese dioxide was placed in a tube which was carefully heated to a temperature of between 190° and 210° C. Through this tube a mixture of alcohols from petroleum, which alcohols boiled between 85°–100° C., was passed along with air and a small amount of steam. The products were passed into water and fatty acids were obtained. An oily portion separated which contained the acetate of these alcohols.

Metallic copper may be similarly oxidized to facilitate the catalytic action, and I do not limit myself to the precise form, type or chemical composition of the catalyzer employed, nor to one which is regenerated at the temperature of oxidation of the alcohol as compared with one which has to be employed intermittently, being re-oxidized at a temperature differing from that at which the alcohol oxidation takes place. Neither do I limit myself to any precise temperature of operation, nor to any particular pressure, these varying according to the nature of the alcohols or other material which is being oxidized, the catalyzer employed and other conditions.

In some cases instead of the pure alcohols mixtures of the alcohols with hydrocarbons may be employed, either olefins or saturated hydrocarbons or mixtures of these. Also it is not beyond the limits of the present invention to directly oxidize the olefins themselves or mixtures containing olefins by contact with catalytic material in the manner aforesaid.

The process is especially intended for the oxidation of secondary alcohols such as isopropyl alcohol to acetic acid or secondary butyl alcohol to methyl ethyl ketone.

What I claim is:

1. The process of forming oxidized products from secondary alcohols corresponding to the olefins of petroleum when in admixture with hydrocarbons, which comprises passing the vapors of the admixed alcohols and hydrocarbons together with air over a heated catalyzer comprising copper.

2. The process of forming oxidized products from secondary alcohols corresponding to the olefins of petroleum when in admixture with hydrocarbons, which comprises passing the vapors of the admixed alcohols and hydrocarbons together with air and steam over a heated catalyzer comprising copper.

ALFRED A. WELLS.